United States Patent
Tscherbner et al.

(10) Patent No.: US 8,573,702 B2
(45) Date of Patent: Nov. 5, 2013

(54) SEAT ASSEMBLY HAVING AN ADJUSTABLE HEAD RESTRAINT ASSEMBLY

(75) Inventors: Achim Tscherbner, Ingolstadt (DE); Karsten Mueller, Ingolstadt (DE); Frank Kunert, Ingolstadt (DE); Dhananjay Lachyan, Maharashtra (IN)

(73) Assignee: Lear Corporation, Southfield, MI (US)

( * ) Notice: Subject to any disclaimer, the term of this patent is extended or adjusted under 35 U.S.C. 154(b) by 228 days.

(21) Appl. No.: 12/878,322

(22) Filed: Sep. 9, 2010

(65) Prior Publication Data

US 2011/0089737 A1 Apr. 21, 2011

(30) Foreign Application Priority Data

Oct. 20, 2009 (DE) .................. 10 2009 045 833

(51) Int. Cl.
*A47C 7/38* (2006.01)

(52) U.S. Cl.
USPC ........................................... 297/410

(58) Field of Classification Search
USPC .................................. 297/410, 391
See application file for complete search history.

(56) References Cited

U.S. PATENT DOCUMENTS

| | | | |
|---|---|---|---|
| 477,197 A * | 6/1892 | Barker | 297/403 |
| 4,265,482 A | 5/1981 | Nishimura et al. | |
| 4,350,389 A * | 9/1982 | Parsson et al. | 297/410 |
| 4,353,595 A | 10/1982 | Kaneko et al. | |
| 4,674,797 A | 6/1987 | Tateyama | |
| 4,840,428 A | 6/1989 | Kobayashi et al. | |
| 4,844,544 A | 7/1989 | Ochiai | |
| 4,861,107 A | 8/1989 | Vidwans et al. | |
| 4,991,907 A | 2/1991 | Tanaka | |
| 5,026,120 A * | 6/1991 | Takeda et al. | 297/408 |
| 5,180,207 A | 1/1993 | Schmidt | |
| 5,531,505 A | 7/1996 | Baetz et al. | |
| 5,660,441 A | 8/1997 | Nagayasu et al. | |
| 5,683,141 A | 11/1997 | Wakamatsu et al. | |
| 6,079,776 A | 6/2000 | Breitner et al. | |
| 6,082,817 A | 7/2000 | Mueller | |
| 6,129,421 A | 10/2000 | Gilson et al. | |
| 6,390,558 B2 | 5/2002 | Fischer et al. | |
| 6,688,697 B2 | 2/2004 | Baumann et al. | |
| 6,715,829 B2 | 4/2004 | Svantesson et al. | |
| 6,722,740 B2 | 4/2004 | Imayou et al. | |
| 6,767,064 B2 | 7/2004 | Veine et al. | |
| 6,805,411 B2 | 10/2004 | Gramss et al. | |

(Continued)

FOREIGN PATENT DOCUMENTS

| | | |
|---|---|---|
| DE | 4328054 A1 | 2/1995 |
| DE | 19603911 | 8/1997 |

(Continued)

OTHER PUBLICATIONS

German Patent & Trademark Office, Office Action for the corresponding German Patent Application 10 2009 045 833.6 mailed Mar. 3, 2010.

*Primary Examiner* — Milton Nelson, Jr.
(74) *Attorney, Agent, or Firm* — Brooks Kushman P.C.

(57) ABSTRACT

A seat assembly that includes a seat back, a support post disposed on the seat back, and a headrest moveably disposed on the support post. The headrest includes first and second transverse members disposed on the support post and a spindle assembly rotatably associated with the first and second transverse members. The spindle assembly rotates to permit movement of the headrest.

16 Claims, 4 Drawing Sheets

(56) References Cited

U.S. PATENT DOCUMENTS

| | | |
|---|---|---|
| 6,824,212 B2 | 11/2004 | Malsch et al. |
| 6,899,395 B2 | 5/2005 | Yetukuri et al. |
| 6,983,995 B1 | 1/2006 | Veine et al. |
| 7,048,336 B2 | 5/2006 | Mawbey et al. |
| 7,070,235 B2 | 7/2006 | Schilling et al. |
| 7,073,863 B1 | 7/2006 | Low et al. |
| 7,111,901 B2 | 9/2006 | Schlierf et al. |
| 7,137,668 B2 | 11/2006 | Kreitler |
| 7,195,313 B2 | 3/2007 | Hippel et al. |
| 7,232,187 B1 | 6/2007 | Sundararajan et al. |
| 7,316,455 B2 * | 1/2008 | Metz et al. .................. 297/410 |
| 7,758,127 B2 | 7/2010 | Bokelmann et al. |
| 7,946,653 B2 | 5/2011 | Robert et al. |
| 8,297,705 B2 * | 10/2012 | Brunner et al. ............... 297/410 |
| 2001/0028191 A1 | 10/2001 | Lance |
| 2001/0040396 A1 | 11/2001 | Kreuels et al. |
| 2002/0074843 A1 | 6/2002 | Malsch et al. |
| 2004/0070252 A1 | 4/2004 | Stenzel et al. |
| 2004/0195894 A1 | 10/2004 | Pal et al. |
| 2005/0077762 A1 | 4/2005 | Kraemer et al. |
| 2005/0116515 A1 | 6/2005 | Schlierf et al. |
| 2006/0071518 A1 | 4/2006 | Hippel et al. |
| 2006/0226688 A1 | 10/2006 | Terada et al. |
| 2007/0158990 A1 | 7/2007 | Hermansson et al. |
| 2007/0216211 A1 | 9/2007 | Mori |
| 2008/0007105 A1 | 1/2008 | Viger |
| 2009/0058162 A1 | 3/2009 | Boes et al. |
| 2009/0058163 A1 | 3/2009 | Bokelmann et al. |
| 2009/0146479 A1 | 6/2009 | Boes et al. |
| 2009/0184556 A1 | 7/2009 | Bokelmann et al. |
| 2009/0218874 A1 | 9/2009 | Meiller et al. |
| 2010/0045090 A1 | 2/2010 | Brunner et al. |
| 2012/0126605 A1 | 5/2012 | Gross et al. |

FOREIGN PATENT DOCUMENTS

| | | |
|---|---|---|
| DE | 19714283 | 11/1997 |
| DE | 19632560 | 2/1998 |
| DE | 19748594 A1 | 5/1999 |
| DE | 10041533 A1 | 3/2002 |
| DE | 102004005695 A1 | 8/2004 |
| DE | 10312517 A1 | 10/2004 |
| DE | 102006015785 A1 | 10/2006 |
| DE | 102007048152 B3 | 1/2009 |
| DE | 102009004554 A1 | 7/2009 |
| EP | 0914958 A2 | 5/1999 |
| EP | 0914985 B2 | 9/2006 |
| FR | 2852066 | 9/2004 |
| GB | 2302706 A | 1/1997 |
| GB | 2340744 A | 3/2000 |
| JP | 05269030 A | 10/1993 |
| WO | 2004089688 A1 | 10/2004 |
| WO | 2007073034 A1 | 6/2007 |

* cited by examiner

SEAT ASSEMBLY HAVING AN ADJUSTABLE HEAD RESTRAINT ASSEMBLY

CROSS-REFERENCE TO RELATED APPLICATIONS

This application claims foreign priority benefits under 35 U.S.C. §119(a)-(d) to DE 10 2009 045 833.6, filed Oct. 20, 2009, which is hereby incorporated by reference in its entirety.

BACKGROUND OF THE INVENTION

Field of the Invention

The present invention relates to a seat assembly having an adjustable head restraint assembly.

SUMMARY OF THE INVENTION

In at least one embodiment, a seat assembly is provided. The seat assembly includes a seat back, a support post disposed on the seat back, and a headrest moveably disposed on the support post. The headrest includes first and second transverse members, a spindle assembly, and a locking mechanism. The first and second transverse members are disposed on the support post. The spindle assembly is rotatably associated with the first and second transverse members. The locking mechanism is disposed on the first transverse member. The locking mechanism engages the spindle assembly to inhibit movement of the headrest and disengages the spindle assembly to permit movement of the headrest.

In at least one embodiment, a seat assembly is provided. The seat assembly includes a seat back, a first support post fixedly disposed on the seat back, and a headrest moveably disposed on the first support post. The headrest includes first and second transverse members, a spindle assembly, and a locking mechanism. The first transverse member is moveably disposed on the first support post. The second transverse member is fixedly disposed on the first support post and has a threaded bushing. The spindle assembly is rotatably received by the first and second transverse members and has a threaded portion that engages the threaded bushing. The locking mechanism is disposed on the first transverse member. The locking mechanism disengages the spindle assembly to permit the spindle assembly to rotate about an axis of rotation to move the headrest along the first support post.

In at least one other embodiment, a seat assembly is provided. The seat assembly has a seat back, a support post disposed on the seat back, and a headrest moveably disposed on the support post. The headrest includes first and second transverse members, a spindle assembly, and an electrical machine. The first and second transverse members are disposed on the support post. The second transverse member has a threaded bushing. The spindle assembly is rotatably disposed on the first transverse member. The spindle assembly includes a threaded portion that engages the threaded bushing. The electrical machine is configured to engage the threaded portion. The electrical machine rotates the spindle assembly about a first axis of rotation in a first direction to actuate the first transverse member toward the second transverse member.

DETAILED DESCRIPTION

Detailed embodiments of the present invention are disclosed herein; however, it is to be understood that the disclosed embodiments are merely exemplary of the invention that may be embodied in various and alternative forms. The figures are not necessarily to scale, some features may be exaggerated or minimized to show details of particular components. Therefore, specific structural and functional details disclosed herein are not to be interpreted as limiting, but merely as a representative basis for the claims and/or as a representative basis for teaching one skilled in the art to variously employ the present invention.

Figures 1, 2:
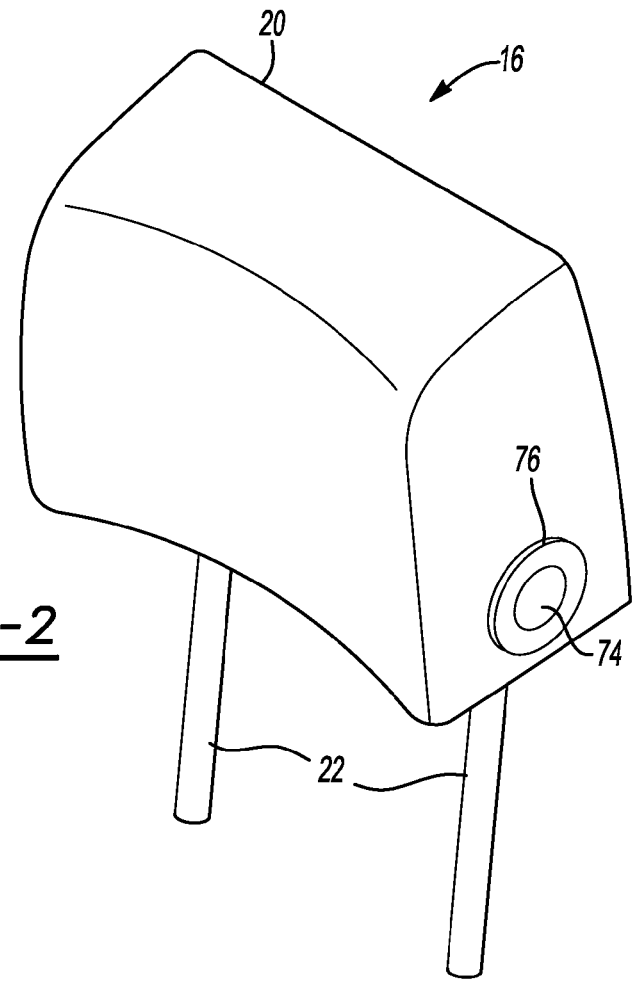
FIG. 1 is a perspective view of a seat assembly.
FIG. 2 is a perspective view of an embodiment of a head restraint assembly.

Referring to FIG. 1, an exemplary seat assembly 10 is shown. The seat assembly 10 may be configured for use in a vehicle, such as a motor vehicle like a car or truck.

The seat assembly 10 may include a seat bottom 12 and a seat back 14. In a vehicular application, the seat bottom 12 may be configured to be mounted on a support surface, such as a floor pan of a vehicle. The seat bottom 12 may be configured to support a seat occupant. The seat back 14 may be pivotally disposed on the seat bottom 12 and may include a head restraint assembly 16. The seat back 14 may be configured to support the back of a seat occupant.

Figure 3:
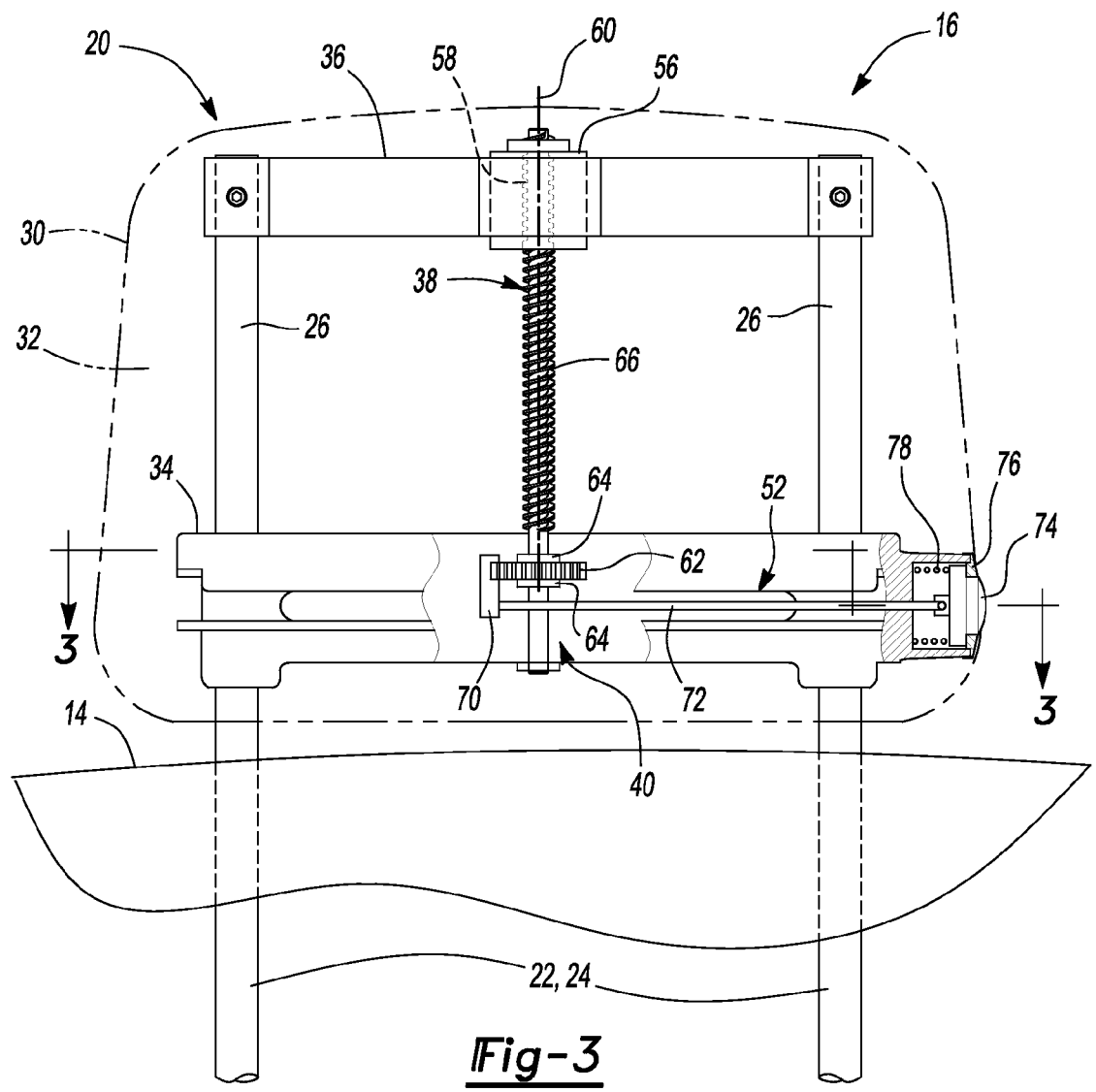
FIG. 3 is a fragmentary side view of the head restraint assembly in a first position.

Referring to FIGS. 2 and 3, the head restraint assembly 16 may include a headrest 20 and one or more support posts 22. The headrest 20 may be moveably disposed on the support posts 22 as will be described in more detail below. The support posts 22 may be disposed on the seat back 14 may be made of any suitable material or materials, such as a metal or metal alloy. The support posts 22 may include a lower portion 24 and an upper portion 26.

The lower portion 24 may be configured as one or more tubes and may be generally linear in one or more embodiments. The lower and upper portions 24, 26 may or may not be coaxially disposed. The lower portion 24 may extend through the top of the seat back 14. In addition, the lower portion 24 may be fixedly mounted to a structural frame of the seat back 14 such that the support posts 22 do not move with respect to the seat back 14. Alternatively, the lower portion 24 may move with respect to the seat back 14 in one or more embodiments. For instance, the lower portion 24 may be disposed in a guide sleeve that may be disposed on the frame of the seat back 14 or may be part of an active head restraint system that is configured to move in response to a load force or vehicle impact event.

Referring to FIG. 3, the headrest 20 may be configured to support the head of an occupant of the seat assembly 10. The headrest 20 may be generally be disposed above the seat back 14 and may include a trim cover 30, a cushion 32, a first transverse member 34, a second transverse member 36, a spindle assembly 38, and a locking mechanism 40.

The trim cover 30 may cover at least a portion of a visible exterior surface of the headrest 20. The trim cover 30 may be made of any suitable material or materials, such as a fabric, vinyl, leather, or the like. The trim cover 30 may cover the cushion 32, which may be disposed under at least a portion of the trim cover 30.

The first transverse member 34 may be moveably disposed on the support post 22. For example, the first transverse member 34 may include an opening through which the upper portion 26 of the support post 22 extends. In the embodiment shown, a pair of openings is provided near opposite ends of the first transverse member 34 that each receives a support post 22.

Figure 4:
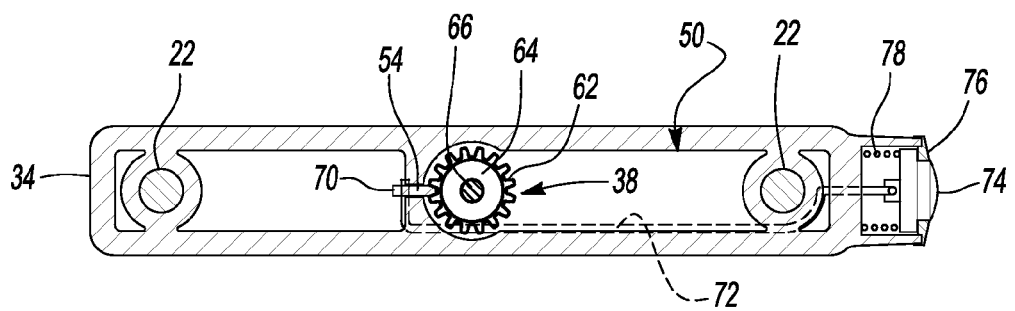
FIG. 4 is a fragmentary top view of the head restraint assembly shown in FIG. 3 along section line 3-3.

Referring to FIGS. 3 and 4, the first transverse member 34 may include a first aperture 50, a second aperture 52, and a slot 54. The first aperture 50 may be disposed in a top surface of the first transverse member 34 and may receive a portion of the spindle assembly 38 as will be discussed in more detail below. The second aperture 52 may extend from an end of the first transverse member 34 generally toward the slot 54. The second aperture 52 may be disposed in any suitable location. For instance, the second aperture 52 may be a groove disposed in an exterior surface of the first transverse member 34 or may be a hole disposed in the first transverse member 34. The slot 54 may generally connect the first and second apertures 50, 52. In FIG. 4, the slot 54 extends through the first transverse member 34. The second aperture 52 and the slot 54 may be associated with or receive at least a portion of the locking mechanism 40 as will be discussed in more detail below.

The second transverse member 36 may be fixedly disposed on the support post 22. For example, the second transverse member 36 may include an opening into which the upper portion 26 of the support post 22 extends. In the embodiment shown, a pair of openings is provided near opposite ends of the second transverse member 36 that each receives a support post 22. The second transverse member 36 may be secured to the support post in any suitable manner, such as with a fastener or interference fit. Moreover, the second transverse member 36 may be integrally formed with or be part of the support post 22 in one or more embodiments. The second transverse member 36 may be substantially parallel to the first transverse member 34.

The second transverse member 36 may be configured to receive the spindle assembly 38. For instance, the second transverse member 36 may include an opening that receives a bushing 56. The bushing 56 may include a threaded through hole 58 that may rotatably receive the spindle assembly 38 as will be discussed in more detail below. The bushing 56 may be fixedly disposed on the second transverse member 36 and may be disposed near the center of the second transverse member 36.

The spindle assembly 38 may extend between the first and second transverse members 34, 36. The spindle assembly 38 may be configured to rotate about an axis of rotation 60 and may include an engagement feature 62, one or more collars 64, and a threaded portion 66.

The engagement feature 62 may be fixedly disposed on the spindle assembly 38. In the embodiment shown, the engagement feature 62 is configured as a gear having a plurality of teeth and may be secured with one or more collars 64. The engagement feature 62 may be disposed in the first aperture 50 of the first transverse member 34.

The threaded portion 66 may be disposed proximate the engagement feature 62. In the embodiment shown, the threaded portion 66 generally extends from the engagement feature 62 toward the second transverse member 36. The threaded portion 66 may include one or more threads that mate with the threaded through hole 58 of the bushing 56. In at least one embodiment, the threads may be configured such that the distance of travel of the first transverse member 34 per spindle assembly revolution is a function of the thread pitch. The engagement feature 62 and thread pitch of the threaded portion 66 may be configured to provide a desired distance of travel per revolution and to provide a desired number or configuration of locking positions. For example, the quantity and partitioning of teeth on the engagement feature 62 may be selected to provide a desired number or configuration of discrete locking positions.

The locking mechanism 40 may be configured to selectively inhibit or permit rotation of the spindle assembly 38. More specifically, the locking mechanism 40 may engage the spindle assembly 38 to inhibit rotation of the spindle assembly 38 and may disengage the spindle assembly 38 to permit rotation of the spindle assembly 38.

In at least one embodiment, the locking mechanism 38 may include a locking pin 70, a linkage 72, and an input device 74. The input device 74 may include a bezel 76 and a spring 78.

The locking pin 70 may be moveably associated with the first transverse member 34. For instance, the locking pin 70 may be moveably disposed in the slot 54 in the first transverse member 34. The locking pin 70 may move between an engagement position and a disengagement position. In the engagement position, the locking pin 70 may engage a portion of the spindle assembly 38, such as the engagement feature 62. For example, the locking pin 70 may be disposed in a gap between adjacent gear teeth to inhibit rotation of the spindle assembly 38. In the disengagement position, the locking pin 70 may not engage a portion of the spindle assembly 38. For example, the locking pin 70 may be spaced apart from the engagement feature 62, thereby permitting the spindle assembly 38 to rotate when a sufficient actuation force is provided. The locking pin 70 may be disposed proximate one end of the slot 54 in the engagement position and may be disposed proximate an opposite end of the slot 54 in the disengagement position.

The linkage 72 may extend between the locking pin 70 and the input device 74. In at least one embodiment, the linkage 72 may be configured as a wire that may include a first end that engages the locking pin 70 and a second end disposed opposite the first end that may engage or be operatively connected to the input device 74. The linkage 72 may be at least partially disposed in the second aperture 52 of the first transverse member 34. In addition, the linkage 72 may be integrally formed with the locking pin 70 in one or more embodiments.

The input device 74 may be configured to actuate the locking pin 70 and linkage 72. The input device 74 may have any suitable configuration. For example, the input device 74 may be configured as a button that extends at least partially through a hole in a headrest 20. A bezel 76 may be provided that extends at least partially around the button to facilitate mounting and help provide a desired aesthetic appearance. The input device 74 may be disposed in any suitable location. In the embodiment shown, the input device 74 is disposed proximate an end of the first transverse member 34. The input device 74 may include a spring 78 that exerts a biasing force. For instance, the spring 78 may be disposed between the first transverse member 34 and a back surface the input device 74 and may bias the input device 74 away from the first transverse member 34, thereby actuating the locking mechanism 40 into engagement with the spindle assembly 38.

Figure 5:
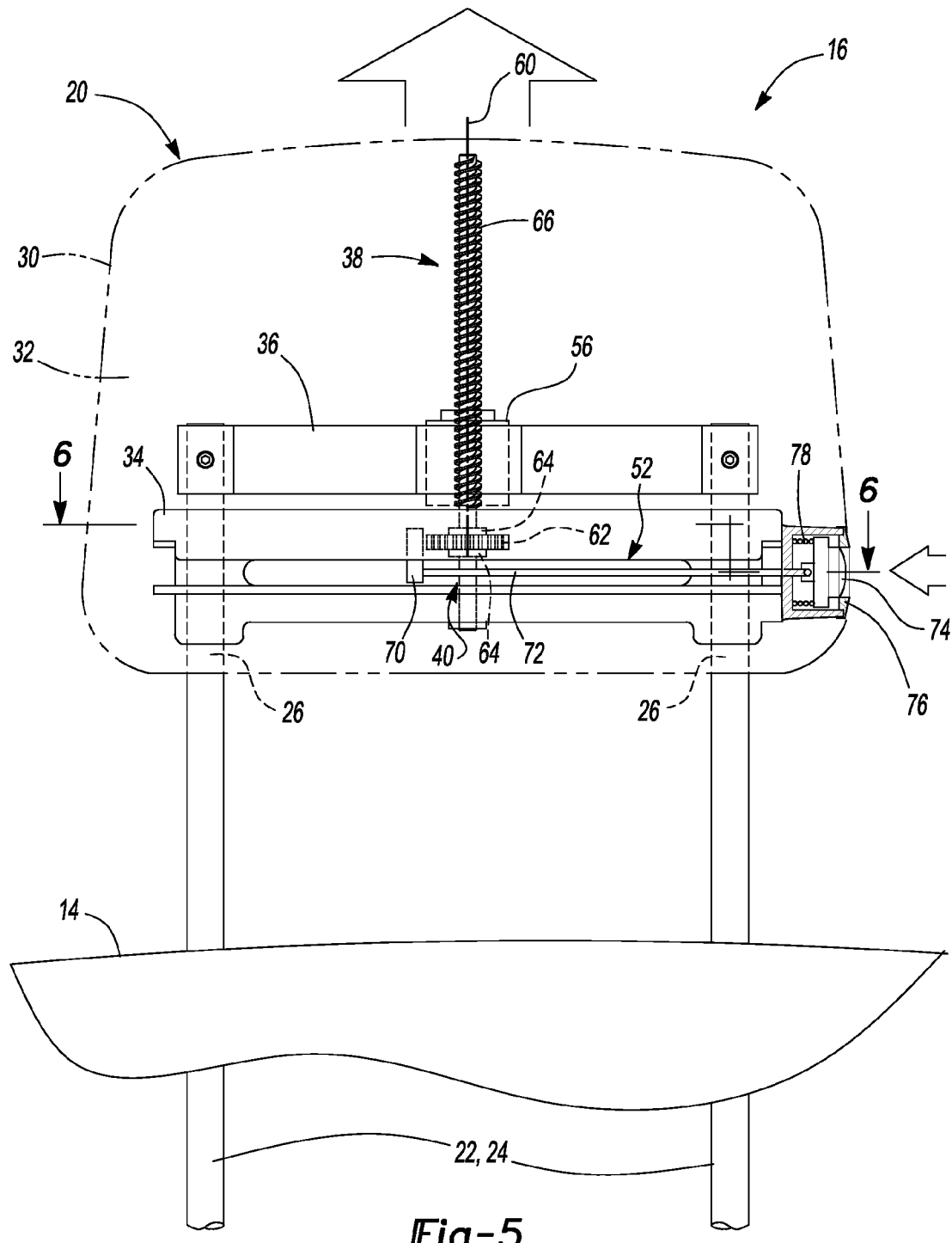
FIG. 5 is a fragmentary side view of the head restraint assembly in a second position.

Actuation of the headrest 20 will now be described in more detail. In FIG. 3, the headrest 20 is shown in a first position in which the headrest is positioned toward the seat back 14. In FIG. 5, the headrest 20 is shown in a second position in which the headrest 20 is positioned away from the seat back 14. The first and second positions may represent the maximum travel range of the headrest 20. The first and second transverse members 34, 36 may contact when the headrest 20 is in the second position. In addition, the headrest 20 may travel in a substantially linear manner in embodiments where the upper portion 26 of the support post 22 is substantially linear.

Figure 6:
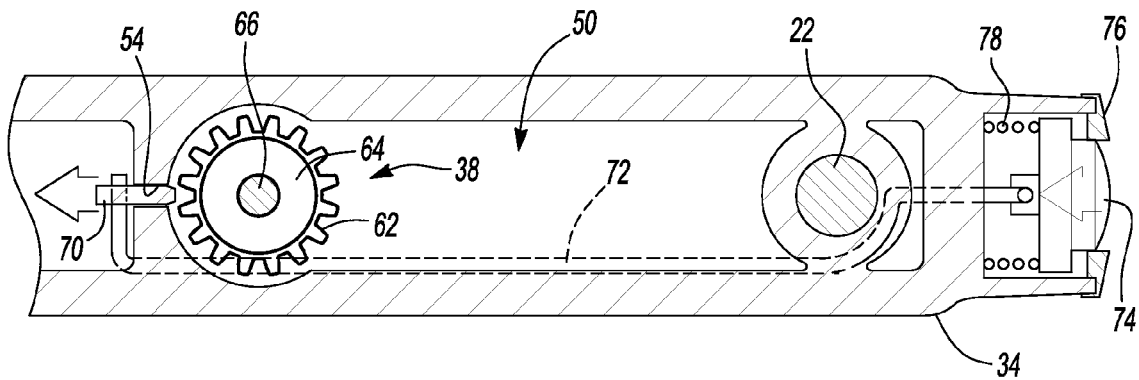
FIG. 6 is a fragmentary top view of the head restraint assembly shown in FIG. 5 along section line 6-6.

In FIGS. 3 and 4, the locking mechanism 40 is in the engagement position, which may inhibit movement of the headrest 20 with respect to the support post 22. The locking mechanism 40 moves from the engagement position to the disengagement position shown in FIGS. 5 and 6 when sufficient force is applied to the input device 74 to overcome the biasing force of the spring 78. As such, the linkage 72 and locking pin 70 are moved such that the locking pin 70 disengages the spindle assembly 38.

An actuation force may then be applied to the headrest 20 to move the first transverse member 34 with respect to the second transverse member 36. For instance, an actuation force may be manually exerted upon the headrest 20 to cause the first transverse member 34 to move along the support post 22. The actuation force causes the threaded portion 66 of the spindle assembly 38 to rotate about the axis of rotation 60. For example, to move from the first position shown in FIG. 3 toward the second position shown in FIG. 5, the actuation force may be generally directed away from the seat back 14, thereby causing the spindle assembly 38 to rotate and be threaded through the bushing 56. Application of an actuation force toward the seat back 14 may cause the spindle assembly 38 to rotate in the opposite direction and cause the headrest 20 to move in the opposite direction. As such, the headrest 20 may be positioned in the first position, second position, or various intermediate positions between the first and second positions when the locking mechanism 40 is in the disengaged position and a sufficient actuation force is applied.

The headrest 20 may be secured in a desired position when the locking mechanism 40 is in the engagement position. For instance, the biasing force of the spring 78 may actuate the locking pin 70 via the linkage 72 into engagement with the spindle assembly 38 when sufficient force is not applied to the input device 74 to overcome the biasing force of the spring 78.

Figure 7:
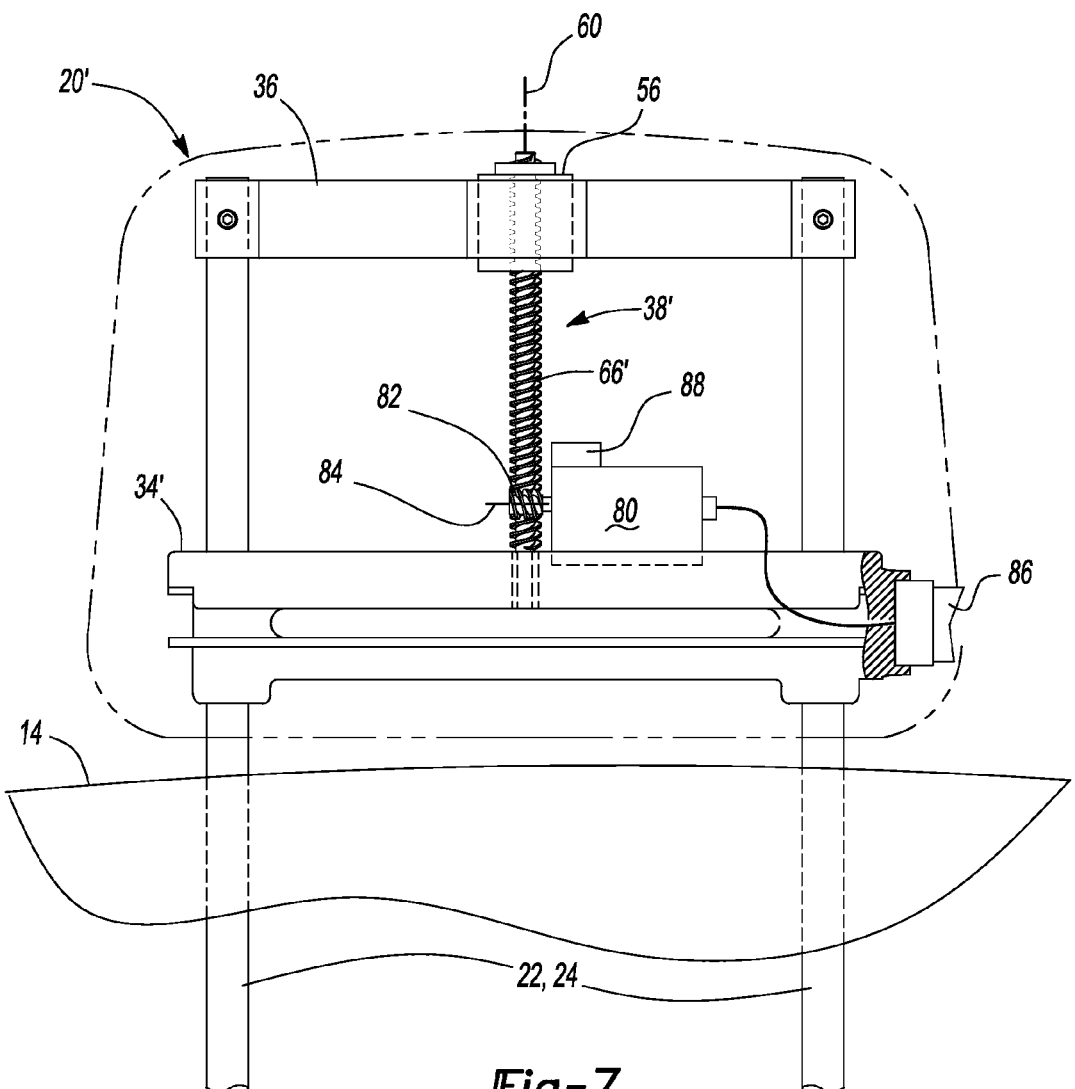
FIG. 7 is a fragmentary side view of another embodiment of a head restraint assembly.

Referring to FIG. 7, another embodiment of a head restraint assembly 16' is shown. In this embodiment, the headrest 20' is similar to that shown in FIG. 3, but the spindle assembly 38' does not include an engagement feature 62 or one or more collars 64 and the locking mechanism 40 has been deleted.

The headrest 20' may include an electrical machine 80, such as a motor, solenoid, or the like, that is configured to actuate the headrest 20'. The electrical machine 80 may be disposed in any suitable location, such as on the first transverse member 34'. The electrical machine 80 may include an output shaft having an engagement gear 82 that engages the threaded portion 66' of the spindle assembly 38'. The electrical machine 80 may rotate the output shaft and the engagement gear 82 about a second axis of rotation 84. Rotation of the engagement gear 82 in a first direction about the second axis of rotation 84 may actuate the first transverse member 34' toward the second transverse member 36. Rotation of the engagement gear 82 in a second or opposite direction about the second axis of rotation 84 may actuate the first transverse member 34' away from the second transverse member 36.

A switch 86 may be provided to control operation of the electrical machine 80. The switch 86 may have any suitable configuration. For instance, the switch 86 may be a toggle switch that may be electrically connected to the electrical machine 80 via a wire. Alternatively, the switch 86 may be in wireless communication with the electrical machine 80, such as via an RF signal and associated controller. The switch 86 may be disposed on the headrest 20' or in any suitable location on or remote from the seat assembly 10.

The electrical machine 80 may be equipped or associated with one or more position sensors 88, such as Hall effect sensors, that may be used to directly or indirectly monitor the position of the headrest 20'. Data indicative of the position of the headrest 20' may be used to control the travel of the headrest 20', such as by limiting operation of the electrical machine 80 to a direction or distance in which headrest travel is not impeded. In addition, data indicative of the position of the headrest 20' may be compared to a desired headrest position that may be stored in memory and the electrical machine 80 may be operated to move the headrest 20' to the desired headrest position when the current headrest position differs from the desired position.

The headrest 20' may be disposed in a stationary position when sufficient actuation force is not provided by the electrical machine 80. In addition, the headrest 20' may also be provided in one or more embodiments that incorporate the features of FIGS. 3 and 7. For instance, a locking mechanism may be provided with the embodiment shown in FIG. 7 to provide additional control to inhibit movement of the headrest 20'.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A seat assembly comprising:
a seat back;
a support post disposed on the seat back; and
a headrest moveably disposed on the support post, the headrest including:
first and second transverse members disposed on the support post;
a spindle assembly rotatably associated with the first and second transverse members; and
a locking mechanism disposed on the first transverse member;
wherein the locking mechanism engages the spindle assembly to inhibit movement of the headrest and disengages the spindle assembly to permit movement of the headrest.

2. The seat assembly of claim 1 wherein the second transverse member further comprises a bushing that is fixedly disposed on the second transverse member and includes a threaded through hole that engages a threaded portion of the spindle assembly.

3. The seat assembly of claim 1 wherein the headrest moves from a first position toward a second position when the locking mechanism is disengaged from the spindle assembly and an actuation force is applied to an exterior surface of the headrest.

4. The seat assembly of claim 1 wherein the spindle assembly rotates in response to a sufficient actuation force applied to an external surface of the headrest when the locking mechanism is disengaged from the spindle assembly and the spindle assembly does not rotate in response to the actuation force when the locking mechanism is engaged with the spindle assembly.

5. The seat assembly of claim 1 wherein the first transverse member is moveably disposed on the support post and the second transverse member is fixedly disposed on the support post.

6. The seat assembly of claim 1 wherein the spindle assembly includes a gear received by the first transverse member.

7. The seat assembly of claim 6 wherein the locking mechanism includes a locking pin that engages the gear to inhibit movement of the headrest and disengages the gear to permit movement of the headrest.

8. The seat assembly of claim 7 wherein the first transverse member further comprises a slot that receives the locking pin.

9. The seat assembly of claim 7 wherein the locking mechanism further comprises a button and a linkage that extends from the button to the locking pin.

10. A seat assembly comprising:
   a seat back;
   a first support post fixedly disposed on the seat back; and
   a headrest moveably disposed on the first support post, the headrest including:
      a first transverse member moveably disposed on the first support post;
      a second transverse member fixedly disposed on the first support post, the second transverse member having a threaded bushing;
      a spindle assembly rotatably received by the first and second transverse members, the spindle assembly including a threaded portion that engages the threaded bushing; and
      a locking mechanism disposed on the first transverse member;
   wherein the locking mechanism disengages the spindle assembly to permit the spindle assembly to rotate about an axis of rotation to move the headrest along the first support post.

11. The seat assembly of claim 10 wherein the threaded portion moves through the threaded bushing as the second transverse member moves toward the first transverse member.

12. The seat assembly of claim 10 further comprising a second support post, wherein the spindle assembly is disposed between the first and second support posts.

13. The seat assembly of claim 10 wherein the first and second transverse members are spaced apart when disposed in a first position and are not spaced apart when disposed in a second position.

14. The seat assembly of claim 10 wherein the spindle assembly continuously rotates about the axis of rotation when the headrest is actuated.

15. The seat assembly of claim 10 wherein the second transverse member is disposed at an end of the support post and the first transverse member is disposed between the second transverse member and the seat back.

16. The seat assembly of claim 10 wherein the locking mechanism further comprises a pin disposed in a slot in the first transverse member, a button disposed proximate the first transverse member, a linkage extending between the button and the pin, and a spring that exerts a biasing force on the button to bias the pin toward the spindle assembly.

* * * * *